US012755585B2

(12) United States Patent
Singh et al.

(10) Patent No.: US 12,755,585 B2
(45) Date of Patent: Oct. 6, 2026

(54) PHYSICAL ENTITY DIAGNOSTIC SYSTEM USING DIGITAL TWINS AND LARGE LANGUAGE MODELS

(71) Applicant: EATON INTELLIGENT POWER LIMITED, Dublin (IE)

(72) Inventors: Karam Jyot Singh, Dublin (IE); Davit Zargaryan, Dublin (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 19/234,805

(22) Filed: Jun. 11, 2025

(65) Prior Publication Data

US 2025/0378720 A1 Dec. 11, 2025

Related U.S. Application Data

(60) Provisional application No. 63/658,521, filed on Jun. 11, 2024.

(51) Int. Cl.

| | |
|---|---|
| ***G06F 17/00*** | (2019.01) |
| ***G06N 3/0895*** | (2023.01) |
| ***G06N 7/00*** | (2023.01) |
| ***G07C 5/08*** | (2006.01) |
| *H02J 13/00* | (2006.01) |

(52) U.S. Cl.

CPC ........... *G07C 5/0808* (2013.01); *G06F 17/00* (2013.01); *G06N 3/0895* (2023.01); *G06N 7/00* (2013.01); *H02J 13/00* (2013.01)

(58) Field of Classification Search

CPC ............................ G07C 5/0808; G06N 3/0895
USPC ........................................................ 701/31.9
See application file for complete search history.

(56) References Cited

FOREIGN PATENT DOCUMENTS

CN 117411180 A * 1/2024 ............. H02J 13/16

OTHER PUBLICATIONS

English translation of CN117411180. (Year: 2024).*

* cited by examiner

*Primary Examiner* — Tiffany P Young
(74) *Attorney, Agent, or Firm* — Eckert Seamans Cherin & Mellott, LLC

(57) ABSTRACT

A physical entity diagnostic system may utilize a digital twin of a physical entity and large language models (LLMs) operative to predict a component failure of the modeled physical entity. A method for predicting a component failure of a physical entity may include generating a digital twin of a physical entity virtually representing the physical entity and components of the physical entity, accessing sensor data of sensors configured to measure information of the components to reproduce operating conditions of the physical entity via the digital twin; executing LLM agents trained to predict a component failure of one of the components of the physical entity virtually represented by the digital twin based on the sensor data, the LLM agents operative to predict the component failure using simulation scenarios based on a simulation objective and to execute simulations for the simulation scenarios using the digital twin.

20 Claims, 5 Drawing Sheets

PHYSICAL ENTITY DIAGNOSTIC SYSTEM USING DIGITAL TWINS AND LARGE LANGUAGE MODELS

CROSS REFERENCE TO RELATED APPLICATIONS

This application claims priority to U.S. Provisional Patent Application Ser. No. 63/658,521, filed on Jun. 11, 2024 and titled "SYSTEM AND METHOD OF PREDICTING A COMPONENT FAILURE IN A VEHICLE USING LARGE LANGUAGE MODEL AGENTS AND A DIGITAL TWIN," the disclosure of which is incorporated herein by reference.

TECHNOLOGICAL FIELD

The present disclosure is directed to systems and methods of computer-based diagnostic systems operative to provide virtual representations and component diagnostics (for instance, component failure predictions) for physical entities, such as a vehicle, and, more particularly, to physical entity virtual representations and component diagnostics using a combined system of digital twins and large language models.

BACKGROUND

A digital twin is a virtual representation of a physical entity or processes. Data are obtained from systems, components, and/or other elements of the physical entity to virtually mirror the physical entity of the digital twin. The data is used to update the digital model and simulate the behavior and performance of the physical entity. For example, a digital twin of a manufacturing facility may include virtual representations of the heating/cooling system, electrical systems, manufacturing equipment, and/or the like. Sensors, such as pressure sensors, temperature sensors, Internet of Things (IoT) sensors, and/or the like may be used to obtain real-time data from the facility systems.

Digital twins save cost, time, and resources by facilitating, for example, visualizing system states, prototyping in product development, remote operations, and data-driven decision making. They also help with risk management, collaboration, and regulatory compliance, improving customer experience and expediting problem resolutions.

Digital twin technology requires a significant amount of resources. For example, in order to perform analytics on an entity, large volumes of data must be generated by sensors, cameras, and/or the like. Digital twin creation, simulation scenario development, simulation execution, and component failure prediction based on simulation results require extensive expertise in each area by operators, for instance, such as experts in specific physical entity domains, software, large data collection, analytics, and/or the like. For example, simulations using a conventional digital twin and associated data requires manual effort and direct operator intervention at each step for defining simulation scenarios, parameter tuning, identifying interactions and relationships, termination criteria, resolution/outcome analysis, and/or the like. Component failure analysis based on ill-defined scenarios and parameters due to lack of domain experience may render the digital twin ineffective or result in damage to the physical entity and/or danger to users. In addition, extensive computing resources are required for executing simulations using conventional digital twin technology, which is costly and time consuming. Even with sufficient computing resources, conventional digital twin systems are constrained in offline and real-time simulations and are bounded by inferencing limitations, restraining their effectiveness and adoption in many industries.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure describes various embodiments of a physical entity diagnostic system implemented using digital twins in combination with large language models (LLMs).

In one embodiment, a computer-implemented method may include, via processing circuitry of at least one computing device, generating a digital twin of a physical entity, the digital twin virtually representing the physical entity and a plurality of components of the physical entity; accessing sensor data of a plurality of sensors configured to measure information of the plurality of components to reproduce operating conditions of the physical entity via the digital twin; executing a plurality of large language model (LLM) agents trained to predict a component failure of one of the plurality of components of the physical entity virtually represented by the digital twin based, at least in part, on the sensor data, the plurality of LLM agents operative to predict the component failure using simulation scenarios based on a simulation objective and to execute simulations for the simulation scenarios using the digital twin.

In some embodiments of the method, the physical entity is a vehicle.

In various embodiments of the method, the one or more sensors include at least one temperature sensor, at least one pressure sensor, at least one rotational speed sensor, or at least one linear speed sensor.

In some embodiments of the method, the one or more components include at least one of a transmission component, a braking system component, a steering component, or an exhaust system component.

In various embodiments of the method, the plurality of LLM agents are trained to create off-line test simulation scenarios based on the simulation objective, execute off-line test simulations based on the off-line test simulation scenarios, and continuously monitor the off-line test simulations.

In some embodiments of the method, continuously monitoring the off-line test simulation includes predicting a component failure based on the simulation results and identifying a reason for the component failure.

In exemplary embodiments of the method, continuously monitoring the off-line test simulation includes providing a solution for the predicted component failure, the solution comprising stopping or modifying the operation of at least one of the plurality of components associated with the component failure.

In some embodiments of the method, the method further includes creating, via at least one of the plurality of LLM agents, online real-time simulation scenarios based on the simulation objective, executing the online real-time test simulations based on the online real-time simulation scenarios and sensor data being streamed from the plurality of sensors to the digital twin in real-time.

In various embodiments of the method, the method further includes continuously monitoring the real-time simulation using the digital twin to predict a component failure based on the real-time simulation results and stored off-line test simulations and component failure prediction data; identifying a reason for the predicted component failure; and providing a solution for the predicted component failure.

In some embodiments of the method, at least one of the plurality of LLM agents is trained to receive tokenized non-text data from at least one of the plurality of sensors and to generate text-based output.

In exemplary embodiments of the method, the text based output includes a failure prediction of a component associated with the at least one of the plurality of sensors.

In one embodiment, an apparatus includes at least one processing circuitry and a memory coupled to the at least one processing circuitry, The memory includes instructions that, when executed by the at least one processing circuitry, cause the at least one processing circuitry to: train at least one large language model (LLM) to predict a component failure of a physical entity based on a digital twin of the physical entity, the digital twin virtually representing the physical entity and a plurality of components of the physical entity, and simulation scenarios based on a simulation objective and execution of the simulations for the simulation scenarios, wherein the simulation scenarios comprise off-line test simulation scenarios and online real-time simulation scenarios.

In some embodiments of the apparatus, the physical entity includes a vehicle and the one or more components include at least one of a transmission component, a braking system component, a steering component, or an exhaust system component.

In various embodiments of the apparatus, the instructions, when executed by the at least one processing circuitry, cause the at least one processing circuitry to train the at least one LLM agent to provide a solution for the predicted component failure, the solution including stopping or modifying the operation of at least one of the plurality of components associated with the component failure.

In some embodiments of the apparatus, the at least one LLM agent includes a primary LLM agent and a plurality of secondary LLM agents, the primary LLM agent is communicatively coupled to the digital twin and at least one external data source, each of the plurality of secondary LLM agents are communicatively coupled to the primary LLM agent and are trained for a specific domain.

In exemplary embodiments of the apparatus, a first of the plurality of secondary LLM agents is configured to create test scenarios based on a defined simulation objective, a second of the plurality of secondary LLM agents is configured to establish initial simulation parameters, and a third of the plurality of secondary LLM agents is configured to determine dynamic conditions among components.

In one embodiment, a vehicle includes an on-board computer system having a memory coupled to a processing circuitry. The memory includes instructions that, when executed by the processing circuitry, cause the at least one processing circuitry to access a digital twin of the vehicle, the digital twin virtually representing the vehicle and a plurality of components of the vehicle, the one or more components comprising at least one of a transmission component, a braking system component, a steering component, or an exhaust system component, access sensor data of a plurality of sensors configured to measure information of the plurality of components to reproduce operating conditions of the vehicle via the digital twin, and execute a plurality of large language model (LLM) agents trained to predict a component failure of one of the components of the physical entity virtually represented by the digital twin. At least a first one of the plurality of LLM agents is trained to predict a failure of a specific component of the plurality of components, and at least a second one of the plurality of LLM agents is trained to receive tokenized non-text data from at least one of the plurality of sensors and to generate text-based output.

In some embodiments of the vehicle, the one or more sensors includes at least one temperature sensor, at least one pressure sensor, at least one rotational speed sensor, or at least one linear speed sensor.

In various embodiments of the vehicle, the plurality of LLM agents are trained to predict the component failure based on executing off-line simulation scenarios and online real-time simulation scenarios based on the digital twin and the sensor data.

In some embodiments of the vehicle, the instructions, when executed by the processing circuitry, cause the at least one processing circuitry to modify an operation of at least one of the plurality of components responsive to receiving a failure predication associated with the at least one of the plurality of components.

In one embodiment, a system includes a vehicle including a plurality of components and a plurality of sensors structured to detect a state of a component and generate vehicle data based on the detected state; a data processor structured to receive the vehicle data from one or more sensors and process the vehicle data; a data storage structured to receive simulation data and continuous simulation monitoring data including component failure prediction data; a vehicle digital twin representing a virtual copy of the vehicle and structured to reproduce current conditions of the vehicle, components, and sensors; and a plurality of large language model (LLM) agents structured to create simulation scenarios based on a simulation objective, execute simulations using the vehicle digital twin based on the scenarios, continuously monitor the simulations, and train based on continuously monitored data.

In one embodiment, a computer-implemented method of predicting a component failure of a vehicle using a vehicle digital twin representing a virtual copy of the vehicle includes collecting, by a vehicle digital twin system, vehicle data from the vehicle, creating simulation scenarios by large language model (LLM) actor agents based on a simulation objective, executing simulations, by the LLM actor agents, based on the simulation scenarios using the vehicle digital twin, continuously monitoring, by a simulation monitoring LLM agent, the simulations, and training, the LLM actor agents and the simulation monitoring LLM agent, based on continuously monitored data.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Various features of an improved physical entity diagnostic system are described in the present disclosure, with reference to the accompanying drawings, in which one or more features of the physical entity diagnostic system are shown and described. The various features described in the present disclosure and depicted in the accompanying drawings may be used independently of, or in combination with, each other. A physical entity diagnostic system as disclosed herein may be embodied in many different forms and should not be construed as being limited to the examples set forth herein. Rather, these examples are provided to convey certain features of the physical entity diagnostic system to those skilled in the art.

A physical entity diagnostic system may be configured to model various components of a physical entity. A physical entity may include any type of physical structure, object, system, component, process, method, and/or the like capable of being measured and/or having measurable features. Measurable features may include, without limitation, location, distance, temperature, pressure, weight, voltage, current, light (intensity), sound, images, size, linear speed, rotational speed, fluid flow, air flow, the presence of movement/motion, a direction of movement/motion, a type of movement/motion, and/or the like. Non-limiting examples of physical entities may include vehicles, buildings, electronic devices, circuits, fluid systems, electrical systems, manufacturing systems, equipment, infrastructure, living organisms, and/or the like.

Although vehicles and a vehicle diagnostic system are used in examples in the present disclosure, these are for illustrative purposes only and embodiments are not so limited. The digital twin technology and the combination of a digital twin and LLM agents described according to some embodiments may be applied to other physical entities or systems.

A physical entity diagnostic system may utilize a digital twin of a physical entity and associated machine learning (ML) models. In some embodiments, the ML models may be or may include large language models (LLM). The physical entity diagnostic system may be configured to predict a component failure of the modeled physical entity using a combination of a digital twin of the physical entity and LLM agents.

Figure 1:
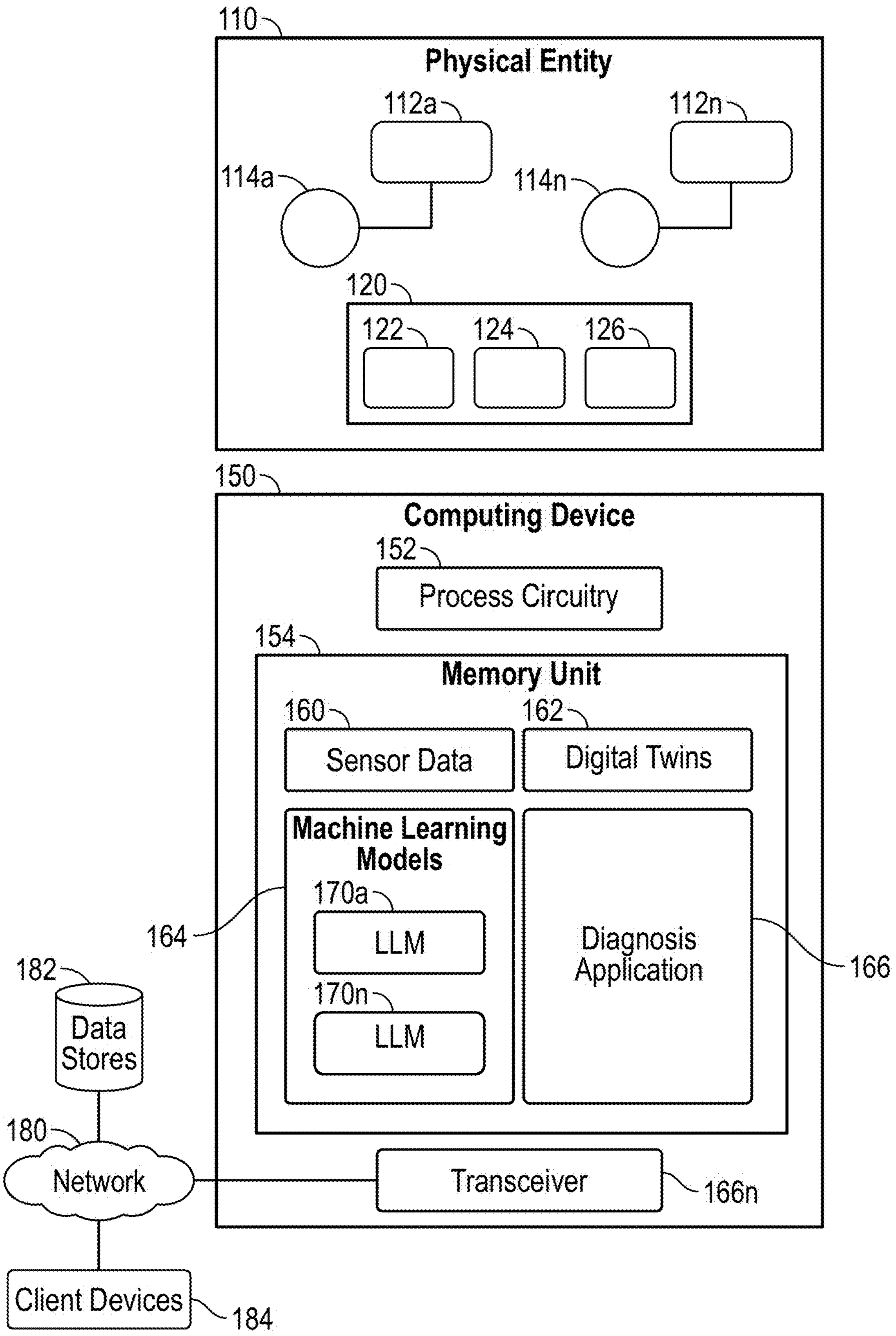
FIG. 1 illustrates a first exemplary operating environment in accordance with the present disclosure.

FIG. 1 illustrates an example of an operating environment 100 that may be representative of some embodiments. As shown in FIG. 1, operating environment 100 may include a physical entity 110 having one or more components 112*a-n*. For example, the physical entity 110 may be a vehicle and the components 112*a-n* may be one or more systems or components of the vehicle, such as a transmission, a braking system, an engine, a cooling system, a heating system, an electrical system, an exhaust system, a display system, a tire, a steering wheel, an on-board computing system, and/or the like. The components 112*a-n* may be associated with one or more sensors 114*a-n* configured to detect or measure various aspects of the components 112*a-n*. Non-limiting examples of measured aspects may include temperature, pressure, linear speed, rotational speed (e.g., rotations per minute), voltage, current, air flow, fluid flow, and/or the like. In some embodiments, a sensor 114*a-n* may be or may include a camera configured to capture images and/or video of a components 112*a-n*.

The sensors 114*a* may provide sensor measurement output in various forms, including analog signals (e.g., voltage, current, and/or the like), digital signals, binary signals, text, characters/symbols, images, sound, combinations thereof, and/or the like. For example, the sensor 114*a* may measure the temperature of the transmission 112*a* of a vehicle and may provide output in the form of an analog voltage signal. In another example, the sensor 114*a* may measure the temperature of the transmission 112*a* and may transform the analog voltage signal into a digital value (e.g., the temperature of the transmission in degrees) that may be externally accessible.

In various embodiments, the sensor data from the sensors 114*a-n* may be provided to a computing device 150. In some embodiments, the computing device 150 may be communicatively coupled to the sensors 114*a-n* to receive the data. In other embodiments, the physical entity 110 may include a control unit 120 that is communicatively coupled to the sensors 114*a-n* and the computing device 150 to provide the sensor data to the computing device 150. The control unit 120 may include a processor 122, memory 124, and/or a transceiver 126 (for instance, for wired or wireless communication with the computing device 150).

In various embodiments, the computing device 150 may be a computing or control device of the physical entity. For instance, the computing device 150 may be an on-board computing system of a vehicle. In some embodiments, the computing device 150 may be a remote server computer or other type of computing device. In various embodiments, the control unit 120 may be the computing device 150. Accordingly, in some embodiments, disclosure relating to the computing device 150 may be applicable to the control unit 120.

Although only one computing device 150 and one control unit 120 are depicted in FIG. 1, embodiments are not so limited. In various embodiments, the functions, operations, configurations, data storage functions, applications, logic, and/or the like described with respect to the computing device 150 and the control unit 120 may be performed by and/or stored in one or more other computing devices (not shown), for example, coupled to computing device 150 via network 180 (for instance, one or more of client devices 184). A single computing device 150 and control unit are depicted for illustrative purposes only to simplify the figure. Embodiments are not limited in this context.

Computing device 150 may include a processor circuitry 152 that may include and/or may access various logics for performing processes according to some embodiments. Processing circuitry 120 and/or portions thereof may be implemented in hardware, software, or a combination thereof. For example, a logic, circuitry, or a module may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, a system-on-a-chip (SoC), memory units, logic gates, registers, semiconductor device, chips, microchips, chip sets, software components, programs, applications, firmware, software modules, computer code, a control loop, a computational model or application, an AI and/or ML model or application, an LLM model or application controller, variations thereof, combinations of any of the foregoing, and/or the like.

Memory unit 154 may include various types of computer-readable storage media and/or systems in the form of one or more memory units and/or storage media. In various embodiments, memory unit 154 may store various types of information and/or applications for a physical entity diagnostic system according to some embodiments. For example, memory unit 154 may store sensor data 160, digital twins 162, ML models 164, and/or a diagnosis application 150. In some embodiments, some or all of sensor data 160, digital twins 162, ML models 164, and/or a diagnosis application 150 may be stored in one or more data stores 182 accessible to computing device 150 via network 180. For example, one or more of data stores 182 may be or may include historical sensor data, a proprietary database, manufacturer information, physical entity operating information, websites, and/or the like.

Sensor data 160 may include data generated via or associated with data generated via sensors 114*a-n*. In various embodiments, the sensor data 160 may include primary (or "raw") sensor data measured directly by the sensors 114*a-n*. For example, for a temperature sensor, the primary sensor data may be or may include primary analog voltage data (with the voltage related to the temperature). In some embodiments, the sensor data 160 may be secondary or processed data based on the actual measurements of the sensors 114*a-n* (for instance, for an analog voltage-based temperature sensor, the sensor data 160 may include processed data indicating a digital, numerical temperature value based on the measured voltage). Non-limiting examples of sensor data 160 may include location (e.g., GPS coordinates), distance, temperature, pressure, weight, voltage, current, light (intensity), sound, images, size, linear speed, rotational speed, fluid flow, air flow, and/or the like.

Digital twins 162 may include digital twins of physical entities, such as a vehicle, a building, manufacturing equipment, and/or the like. A digital twin may virtually model physical aspects of a physical entity via, for example, software objects, containers, threads, digital data, and/or the like. In some embodiments, the digital twin may include virtual representations of the components of the physical entity (e.g., a transmission of a vehicle) and associated sensors. A digital twin 162 may be formed of sub-digital twins, with each sub-digital twin being associated with a component and/or a sensor. For example, a vehicle digital twin may be formed of a transmission digital twin, a transmission temperature sensor digital twin, and/or a transmission pressure sensor digital twin.

ML models 164 may include various AI/ML models used by the system 100 to implement functions of the disclosed embodiments. Non-limiting examples of computational models 136 may include and/or may be formed using an ML model, an AI model, a neural network (NN), an artificial neural network (ANN), a convolutional neural network (CNN), a deep learning (DL) network, a deep neural network (DNN), a recurrent neural network (RNNs), a large language model (LLM), combinations thereof, variations thereof, and/or the like.

In some embodiments, the ML models 164 may include LLMs or LLM agents 170*a-n*. Non-limiting examples of LLMs may include language transformers, Generative Pre-trained Transformer (GPT)-4, GPT-3, GPT-2, Bidirectional Encoder Representations from Transformers (BERT), Large Language Model Meta AI (LLaMA), Pathways Language Model (PaLM), Transformer-XL, encoder-only (masked language models), encoder-decoder (Seq2Seq), decoder only, mixture of experts (MoE), combinations thereof, variations thereof, and/or the like.

The diagnostic application 166 may be configured to perform operational aspects of the physical entity diagnostic system according to various embodiments. The diagnostic application 166 may perform software functions by being executed via the processing circuitry 160. For example, the diagnostic application 166 may receive, process, and/or store sensor data. In another example, the diagnostic application 166 may generate the digital twins 162 and may update the digital twins 162 based on received or accessed sensor data 160. In various embodiments, the diagnostic application 166 may operate to provide a user interface (alone or in combination with the client devices 184). For example, the diagnostic application 166 may provide digital twin status information, alerts, communications, and/or the like to the client devices 184. In various embodiments, the client devices 184 may be or may include embedded computer systems (for instance, an on-board vehicle computer or display system), a mobile computing device (for instance, a mobile phone, a tablet computing device, a workstation, a laptop computing device, and/or the like), and/or other types of computing devices or systems. Accordingly, a user may receive status information, alerts, predictions (e.g., component failure predictions), solutions, instructions, and/or the like from the diagnostic application 166. For example, a user may receive a notification via the diagnostic application 166 of a component failure or a prediction of a component failure in real time while driving a vehicle via a user mobile computing device or an on-board vehicle computing system.

In various embodiments, the sensor data 160 may be transmitted by a physical entity using packets, streams, or other electronic communication units. In some embodiments, the sensor data 160 may be transmitted in a format configured according to the sensor 114*a-n* and/or the component 112*a-n*. For example, the sensor data 160 may be transmitted in a data packet (or data stream segment) formatted with a header indicating the associated component 112*a-n* (e.g., a transmission system) or sensor 114*a-n* (e.g., transmission temperature sensor). The type of data packet (e.g., a vehicle transmission packet) may be configured based on the associated component. For example, a vehicle transmission packet may have two data segments, one for temperature and one for pressure. In another example, a vehicle braking system packet may have a data segment for vehicle speed at break initialization and stopping distance. In another example, analog, non-text information may be designated via a header and provided in a non-text format packet or other electronic communication unit (for instance, to be routed to an LLM trained to handle non-text data as input according to the present disclosure).

The diagnostic application 166 may be configured to read the packet and classify the information, destination, and/or the like accordingly. For example, the LLM 170*a* may be trained for processing sensor data 160 for a transmission system. The diagnostic application 166 may receive a packet and classify the packet as containing transmission sensor data 160. Based on the format, the diagnostic application 166 may process the packet data segments and route or otherwise provide the appropriate data to the correct LLM (i.e., LLM 170*a*). In various embodiments, the diagnostic application 166 may process the data based on the packet type. For instance, for the packet containing transmission temperature sensor data 160, the diagnostic application 166 may transform voltage data in the first segment to an alphanumeric temperature value. In this manner, use of computing, processing, and memory resources as well as ML models may be optimized.

In general, an LLM is trained to receive language (or text-based) input (e.g., "the sky is . . . ") and to generate language (or text-based) output in the form of a prediction of the next word by assigning probabilities to all possible words that could follow a given text and then selecting the most likely one (e.g., "blue" for "the sky is"). The LLMs 170*a-n*, alone or in combination with the diagnostic application 160, may be configured to process non-language input (e.g., voltage values from a temperature sensor) and to transform the non-language input into language output. For example, a voltage reading may be tokenized into text-based symbols, which may be processed by an LLM 170*a-n* trained to evaluate the text-based symbols of the voltage reading to generate the LLM output. A non-limiting example of the LLM output from the voltage input may be the text output of "within range," "no failure imminent," "failure imminent," "further simulations required," and/or the like. The text output of the LLM 170*a-n* may be used by the diagnostic application 166, for instance, to be communicated to a user.

Figure 2:
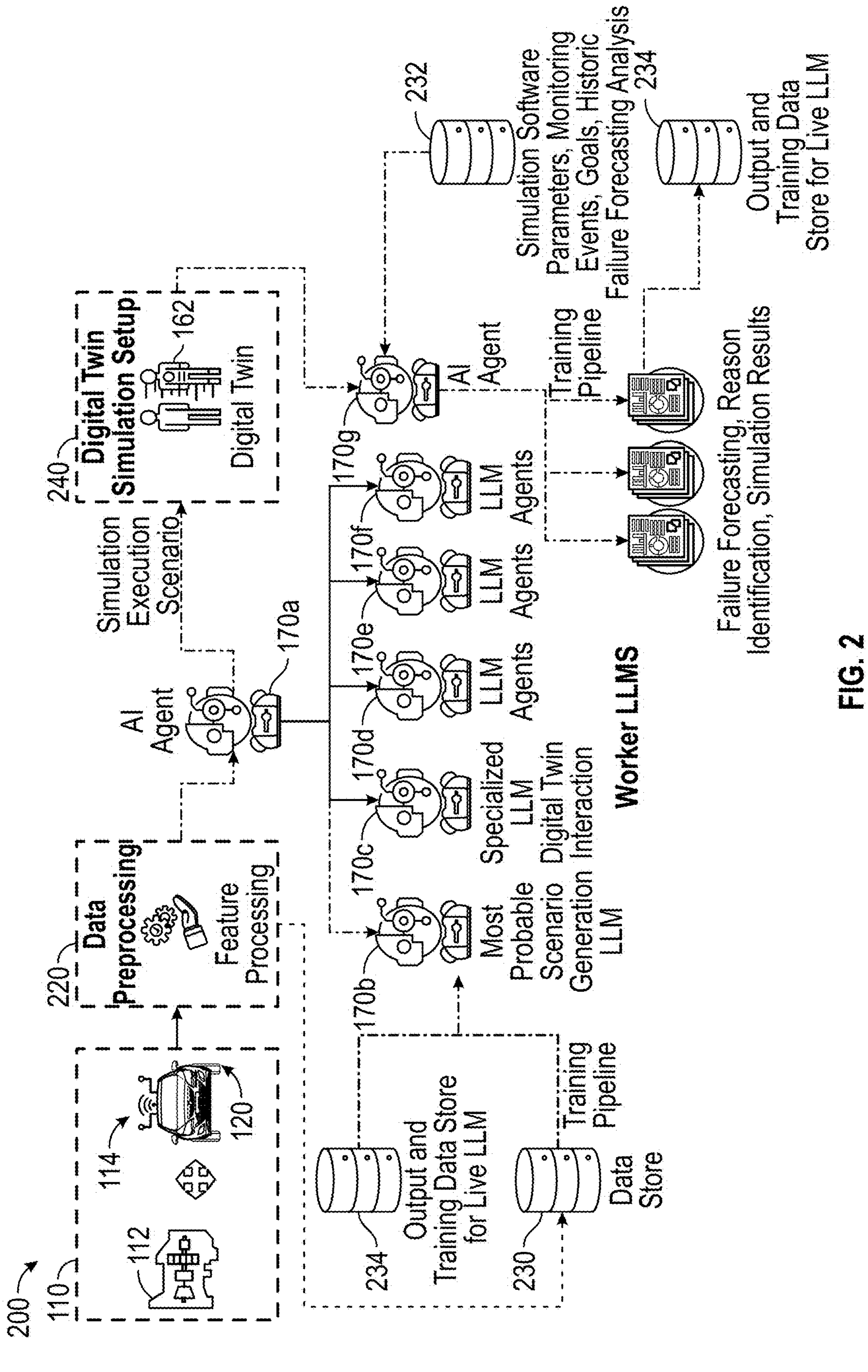
FIG. 2 illustrates a second exemplary operating environment in accordance with the present disclosure.

FIG. 2 illustrates an example of an operating environment 200 that may be representative of some embodiments. As shown in FIG. 2, the operating environment (or system) 200 may be or may include a vehicle diagnostic system. In some embodiments, a function of the vehicle diagnostic system may include predicting a component failure of a vehicle.

In various embodiments, the system 200 may be configured for predicting a component failure by a LLM 170*g* based on off-line test simulations of a digital twin 162 of an actual vehicle 110 in accordance with the present disclosure. The system 200 includes a vehicle 110, a data processor 120, data storages 230, 232, 234, a vehicle digital twin 162, and a plurality of LLM agents 170*a*-170*g*. The vehicle 110 includes a plurality of vehicle components (for example, and without limitation, a transmission, brakes, a chassis, tires, brake pad, electrical systems, and/or the like) 112, a plurality of sensors 114 and a processing unit including a controller (for example, and without limitation, a microprocessor, a microcontroller, etc.) and a memory 116. While FIG. 2 illustrates data storage servers 230, 232, 234 as separate servers, it is to be understood that this is for illustrative purposes only, and thus the data storages 230, 232, 234 may be located in one remote or local database server.

The memory 116 stores vehicle data generated by the sensors 114. The sensors 114 may detect a current state of a vehicle component 112 and generate vehicle data based on the detected state. For example, a temperature sensor detects temperature of the transmission fluid, a pressure sensor monitors the pressure inside the transmission, and a speed sensor monitors the speed of the transmission. In some embodiments, responsive to detecting an anomaly associated with a component 112, the sensors 114 generate vehicle data and transmit the vehicle data to the data processor 120.

The data processor 120 may be, for example, and without limitation, a remote cloud data processor, a local computing processor, and/or the like and may be configured to process the vehicle data. The vehicle data may be processed, for instance, the vehicle data may be filtered, cleaned, transformed, normalized, aggregated, and/or the like. For example, the vehicle data having different periodic intervals may be transformed to include the same or similar periodic granularity. In some embodiments, a behavior profile of each component is analyzed and learned from the processed vehicle data. For example, an operational threshold and state of each component (for example, and without limitation, $1^{st}$, $2^{nd}$, $3^{rd}$, $4^{th}$, $5^{th}$ gear or neutral state of the transmission) can be identified based on an analysis (for example, and without limitation, multivariate change event analysis and anomaly detection) of the processed data, and ML models can be used to classify and interpret different components and their states as classes and determine their thresholds and states. In another example, an LLM model or LLM agent may be specifically configured and trained for a specific vehicle component or system (e.g., a transmission LLM agent, a transmission fluid temperature LLM agent, and/or the like). The processed vehicle data including the component data, analysis results, and learned component behavior profile (for example, and without limitation, thresholds and states of each component) are stored in, for example, and without limitation, a remote data storage 230 for further investigation and analysis. The processed vehicle data are also transmitted to a digital twin system 240.

In some embodiments, the digital twin system 240 includes one or more computers configured to perform a specific function based on instructions included in software, firmware, hardware, or any combination thereof. The software includes a digital twin creation software including instructions to create digital twins based on the vehicle data received. The digital twin creation software is configured to create a vehicle digital twin 162. The vehicle digital twin 162 is a digital representation of the actual vehicle 110 and reproduces current conditions of the vehicle 110, the components 112, and the sensors 114. In some embodiments, the vehicle digital twin 162 may include system elements which may be configured the same or similar to a digital twin (within the vehicle digital twin 162). For instance, the vehicle digital twin 162 may include component digital twins and sensor digital twins. The sensor digital twins are virtual representation of the actual on-board sensors 114 and the component digital twin sensors are virtual copies of actual components 112. The component digital twins behave the same as their physical counterparts 112 and the sensor digital twins replicate the sensing operations of the actual sensors 114 and generate the vehicle data based on the behaviors of respective component digital twins. The vehicle digital twin 162 combines the component and sensor digital twins, incorporating all interactions, arrangements and relationships (for example, and without limitations, effect of different transmission states (1st gear, 2nd gear, etc.) on the rotation speed axle, tire, etc.) among the components 112. That is, the vehicle digital twin 162 combines both data generating components (for example, and without limitations, sensors) and non-data generating components (for example, and without limitations, the transmission, brake, etc.) 112. The vehicle digital twin 162, thus, represents how the vehicle 110 may behave in the future based on the vehicle's current state.

The LLM agents include a plurality of LLM actor agents 170*a*-170*f* and a simulation monitoring LLM agent 170*g*. The plurality of LLM actor agents 170*a*-170*f* includes a primary LLM actor agent 170*a* and secondary LLM actor agents 170*b*-170*f*. The primary LLM actor agent 170*a* is communicatively connected or coupled to the vehicle digital twin 162 and one or more data storages, such as the data storage 130. The secondary LLM actor agents 170*b*-170*f* are communicatively connected to the primary LLM actor agent 170*a* and each secondary LLM actor agent 170*b*-170*f* is configured to perform a specified task, for example, and without limitation, process primary or raw sensor data, transform primary or raw sensor data into text-based or natural language data for use as input by an LLM, create test scenarios based on a user defined simulation objective, establish initial simulation parameters, specify component relationships, determine dynamic conditions among components, define start, pause, stop and exit conditions, execute test simulations, predict a component failure, provide a reason and a solution for the predicted failure, and/or the like.

In some embodiments, the simulation monitoring LLM agent 170*g* is communicatively connected to the vehicle digital twin 162. In various embodiments, the LLM agent 170*g* may be configured to continuously monitor off-line test simulations executed using the vehicle digital twin 162. The primary LLM actor agent 170*a* interacts with the secondary LLM actor agents 170*b*-170*f*. For example, the primary LLM actor agent 170*a* refines specified tasks and provides feedback on the specified tasks performed by each secondary LLM actor agent 170*b*-170*f* until an agreement on the specified task is reached between the primary LLM actor agent 170*a* and each secondary LLM actor agent 170*b*-170*f*. In various embodiments, the primary LLM actor agent 170*a* may select a task and define the tools and/or secondary LLM actor agents 170*b*-170*f* required to perform the task. The functions of the LLM agents 170*a*-170*g* described in the present disclosure are non-limiting and are for illustrative purposes only, for instance, the tasks performed by the LLM agents 170*a*-170*g* can be altered, added or deleted without departing from the described embodiments.

For creating test scenarios, the secondary LLM actor agent 170*b* may be specialized in understanding raw component-specific historic data; the secondary LLM actor agent 170*c* may be specialized in time series data aggregation and understanding the aggregation; the secondary LLM actor agent 170*d* may be specialized in understanding how to utilize third-party software used for establishing parameters for the vehicle digital twin 162 and run test digital twin simulations; the secondary LLM actor agent 170*e* may be specialized in utilizing web crawlers and Internet related tools to obtain additional information required, review external verified information sources and conduct research; and the secondary LLM actor agent 170*f* may be specialized in specific vehicle domain to define test simulation goals, understand simulation results, and conclude the experimentations based on the results.

For example and without limitation, in response to optimizing the aerodynamic design of the vehicle 110 being defined as the simulation objective, simulations to achieve the objective may include testing of, for instance, outer body design, vehicle weight, and/or the like. Further, each secondary LLM actor agent 170*b*-170*f* is trained and fine-tuned based on the vehicle data and specific operation, specialized in domain expertise (for example, and without limitation, aerodynamics or physics associated with the vehicle 110), and/or capable of handling, for example, and without limitation, text, audio, images, or video inputs and outputs.

The scenario creation by the LLM actor agents 170*a*-170*f* provides a technological solution in which the LLM actor agents 170*a*-170*f* automatically create test scenarios and execute test simulations based on the scenarios, in contrast to existing digital simulation technology that requires manual creation of various test scenarios (for example, and without limitation, e.g., safety testing, stress testing, failure testing etc.) for the digital twin simulations. For example, existing digital twin and other digital-based simulation technology requires manual creation of high-level test scenarios by domain experts, and further sub-dividing the high-level test scenarios manually into multiple different individual scenarios for subsequent testing. A vehicle diagnostic system according to the present disclosure advantageously utilizes the LLM actor agents 170*a*-170*f* to automatically create test scenarios based on a user defined simulation objective, execute test simulations using the vehicle digital twin 162, and further create numerous (for example, and without limitations, millions of) actionable scenarios for subsequent simulations and testing.

In addition, the LLM agents 170*a*-170*g* can be easily guided by both technically well-versed users and technical novices because, in some embodiments, the vehicle diagnostic system may operate using a simple user input defining the simulation objective or prompting the test simulations. For example, and without limitation, a simple user input can trigger the LLM actor agents 170*a*-170*f* to perform, for example, and without limitation, safety rating testing for a new chassis. Thus, one initial user input can prompt the LLM actor agents 170*a*-170*f* to create a vast number of test simulation scenarios, rank the test simulation scenarios, and provide a rationale for higher ranked scenarios. The test simulation scenarios are then transmitted from the primary LLM actor agent 170*a* to the vehicle digital twin system 240. The data including the test scenarios, ranks, rationales, simulation results and/or test outcome may be stored within the vehicle digital twin system 240 and/or a remote or local data storage 130, 132, 134.

In various embodiments, since a vehicle 110 includes a large number of components 112 each behaving differently and interacting with other components 112, each component 112 and the overall system 110 can have different parameters at an initial stage of scenarios (parameter initialization), during simulation, and other simulation stages. In some examples, dynamic interactions between components may require re-initialization of existing parameters or creation and initialization of new parameters. Hence, the LLM actor agents 170*a*-170*f* may, if required, dynamically update the existing parameters or initialize new parameters based on the test scenarios. For example, the LLM actor agents 170*a*-170*f* may initialize parameters based on a high-level test scenario and update the parameters or initialize new parameters based on dynamic interaction among the component digital twins. For instance, the LLM actor agents 170*a*-170*f* may complete a simulation, stop the simulation, rerun the simulation and/or perform other criteria calculation for the high-level test scenario. In addition, the LLM actor agents 170*a*-170*f* may break down the high-level test scenario into numerous relevant actionable test scenarios and execute simulations on the actionable test scenarios. The LLM actor agents 170*a*-170*f* can also determine whether to perform different scenarios simultaneously or the same scenarios with different parameters and/or parameter configuration.

The simulation monitoring LLM agent 170*g* is communicatively connected to the digital twin system 240. In some embodiments, the simulation monitoring LLM agent 170*g* is structured to continuously monitor digital twin simulations off-line. Monitoring digital twin simulation of conventional digital twin and other digital representation systems is resource intensive, time consuming, tedious, and requires extreme domain expertise and decision-making capability. The continuous monitoring of the vehicle digital twin 162 includes predicting a component failure. Upon completion of each simulation, the simulation monitoring LLM agent 170*g* analyzes the parameter values and state based on the simulation scenarios and predicts a possible component failure. In some embodiments, the simulation monitoring LLM agent 170*g* determines other components affected by the predicted component failure. Upon predicting the possible component failure, the simulation monitoring LLM agent 170*g* identifies a reason or root cause of the failure of the digital component twin failure. Since the simulation monitoring LLM agent 170*g* can utilize the simulation results and historical predicted component failures, the simulation monitoring LLM agent 170*g* can perform analysis on the parameters and states of different components 112 and identify the reasons for different failures.

For example, the simulation monitoring LLM agent 170*g* can predict that the digital component twin for the transmission may fail due to an external environmental variable reaching a value above a certain threshold. Upon identification of the reason for the predicted failure, the simulation monitoring LLM agent 170*g* may determine if the simulation needs to be executed again, or the simulation has partially achieved a simulation goal and different scenarios are required for achieving the simulation objective. The simulation monitoring LLM agent 170*g* may determine to re-execute the simulation and provide a prompt to the LLM actor agents 170*a*-170*f* to recreate scenarios and/or change parameters based on the simulation objective.

In an example of predicted failure of the digital component twin for the transmission, the LLM actor agents 170*a*-170*f* may create a new scenario to obtain upper and lower limits of a threshold for the parameters of the digital component twin, for instance, that may have caused the transmission failure. Once the new simulation is completed and has achieved one or more simulation goals, the simulation monitoring LLM agent 170*g* may analyze the simulation data to determine a potential solution, for example, and without limitation, raising the threshold for parameters of the digital component twin for the transmission. Then, the simulation monitoring LLM agent 170*g* may continue to monitor the digital twin simulations, including the prediction of a component failure, identification of a reason for the predicted failure, and recommendation of a solution to the predicted failure. Test prediction data including the test simulation results, failure predictions, reasons for the failure and solutions for the failure may be stored in the data storage 134. The test prediction data and the test simulation data including test simulation parameters, test simulation results, events monitored, defined test simulation objectives, historical failure prediction analysis, and/or the like may be stored in the data storage 132 and used to train the LLM agents 170*a*-170*g* with an understanding of relationships among different components, and their parameters and effects on one another. The data including the vehicle data, the test simulation data, the test prediction data, and the training data may be stored in one or more database servers.

Figure 3:
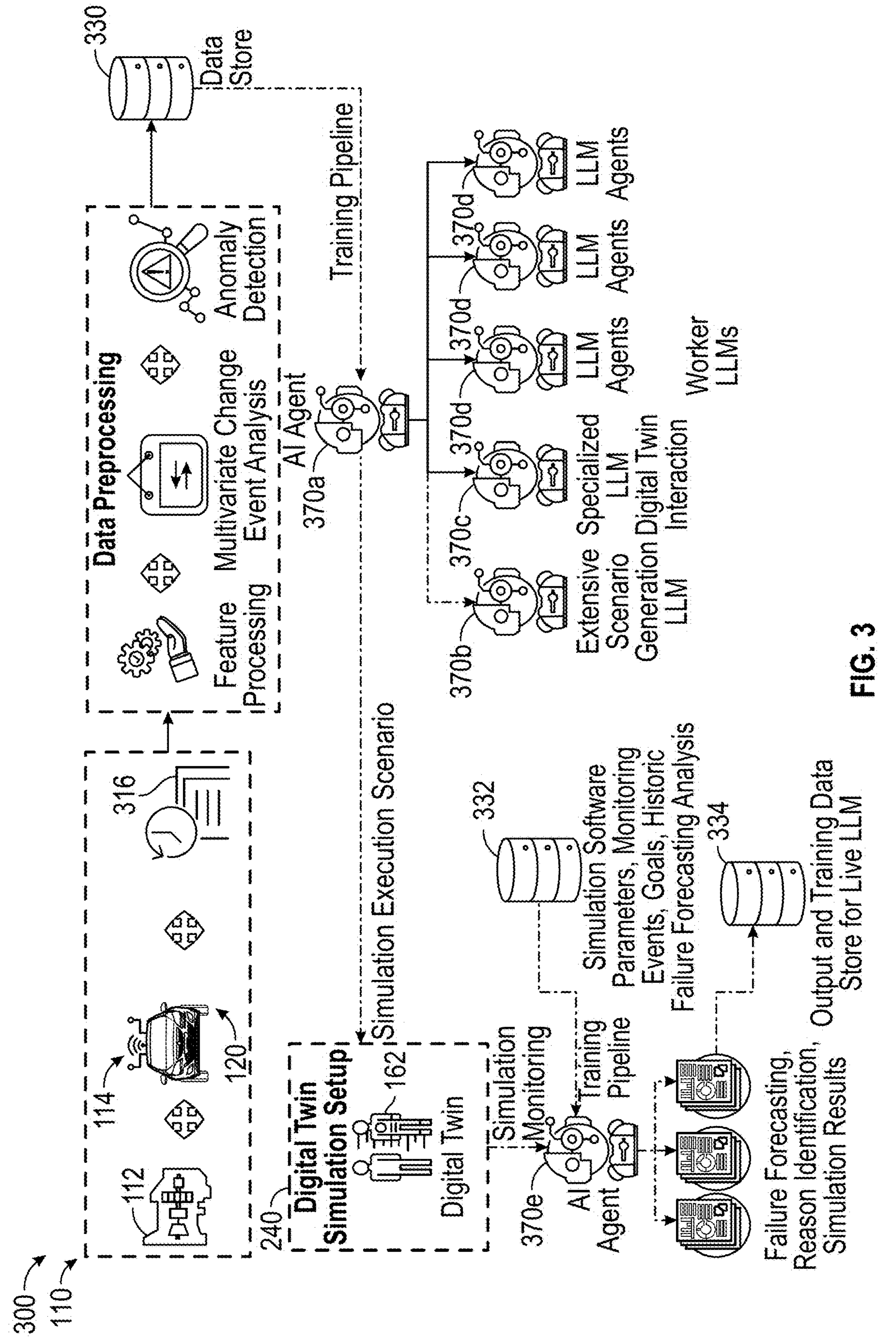
FIG. 3 illustrates a third exemplary operating environment in accordance with the present disclosure.

FIG. 3 illustrates an example of an operating environment 300 that may be representative of some embodiments. As shown in FIG. 3, the operating environment (or system) 300 may be or may include a vehicle diagnostic system. In some embodiments, a function of the vehicle diagnostic system may include predicting a component failure of a vehicle.

In various embodiments, the system 300 may be configured for predicting a component failure based on online real-time simulations of a digital twin 162 of a vehicle 110 and/or stored off-line simulation and failure prediction data. Components and features of the system 300 may be the same, substantially the same, or similar to certain components and features of the system 100 and/or system 200, and, accordingly, overlapping description for similar components and features is omitted. The system 300 differs from the system 200 in that the vehicle data includes real-time data generated by the sensors 114 or electrical components (e.g., switches, circuit breakers, LED indicators, etc.) 112 based on the behaviors of the components 112 and historical data stored in the memory 316 of the vehicle 110; the LLM actor agents 370*a*-370*d* create real-time scenarios and execute real-time simulations using the vehicle digital twin 162 based on live streaming data fed to the digital twin system 240 from the actual vehicle 110 in operation; and that the simulation monitoring LLM agent 370*e* continuously monitors the real-time simulation and predicts and/or preempts a possible component failure or other issues.

LLMs require extensive resources and involve training using large data corpuses, leading to limitations, biases, misinterpretations, and/or the like. The complexity of LLMs leads to inefficiencies and resource requirements that make the use of conventional LLM configurations impractical for use with digital twin technologies, particularly for real time applications. Accordingly, some embodiments use LLM agents (e.g., 170*a-f* or 370*a-e*) that are fine-tuned into domain-specific and task-specific models. In various embodiments, the fine-tuning is performed via a transfer learning technique in which a pre-trained model is further trained on a smaller, task-specific set of data. In this manner, an LLM agent configured according to some embodiments may adapt its knowledge and function to the particulars of a desired task. For example, an LLM agent may be fine-tuned to receive temperature sensor data (e.g., voltage data) from a temperature sensor for a transmission and to generate text output indicating a status of the transmission (e.g., "operating within normal range," "failure predicted," and/or the like). As a result, a vehicle diagnostic system according to some embodiments is able to provide efficiency and scalability that is not possible with conventional LLMs. The domain-specific approach allows for low latency of data analysis of real time data received from a vehicle. For example, it would not be possible to receive live driving data from a vehicle, make a component failure prediction, and transmit the failure prediction (or warning) to a driver in substantially real time with sufficient accuracy using conventionally-trained and configured LLMs.

The real-time simulation and real-time failure prediction implemented by the system 300 (as well as systems 100 and 200) provides technological advantages and solutions to computer-based digital twin and simulation problems experienced by existing systems. While a digital twin may be simulated based on live streaming of vehicle data, behavior and component relationship data and environmental data, it is still limited by latency, computation, prediction, and inference capabilities. According, the LLM agents 370*a*-370*e* execute real-time simulations based on the most important and valuable scenarios for component failure prediction and recommendation of solutions to prevent the predicted failures in real-time.

The simulation monitoring LLM agent 370*e* is configured to predict a component failure based on a real-time simulation and/or stored test simulation and prediction data and to provide a solution for the predicted failure. As such, the LLM agents 370*a*-370*b* initialize simulation parameters, perform dynamic interactions among the vehicle components 112, and execute online real-time simulations based on data generated by the sensors 114, behavior and relationship data among the components 112, and environmental data, all of which are being streamed real-time between the actual vehicle 110 and the vehicle digital twin 162. Real-time live data inputted to the digital twin system 240 from the components 112 and sensors 114 in the actual vehicle 110 are used as parameter values in the vehicle digital twin 162. The simulation monitoring LLM agent 370*e* then can predict a component failure based on the online real-time simulation. For example, if the actual vehicle 110 is operating in the rain, the simulation monitoring LLM agent 370*e* can identify parameters of, for example, and without limitation, of tire or braking system performance based on the instant weather data and the real-time data (for example, and without limitation, vehicle speed) fed from the vehicle 110 as parameter values of the component and sensor digital twins, and then predict component failure (e.g., a brake failure) based on the real-time state of the tire and vehicle speed.

In some embodiments, since the simulation monitoring LLM agent 370*e* has the test simulation and prediction data associated with a vast number (for example, and without limitation, millions) of the test scenarios and failures predicted, it can utilize the test simulation and prediction data to promptly predict one or more component failures and provide immediate solutions for the failure before the actual occurrence of such failure without having to perform the same simulations during live streaming.

In various embodiments, because the system 300 and components thereof (for instance, the simulation monitoring LLM agent 370*e* and actor agents 370*a*-370*e*) operate using real-time data obtained while the vehicle is operating (e.g., the vehicle engine is started, the vehicle is being driven, and/or the like), a vehicle associated with the vehicle digital twin 162 may be diagnosed by the system 300 while being driven. A component failure may be predicted during driving of the vehicle in real-time or substantially real-time to alert an operator of a potential failure, avoiding further damage to the vehicle that may have occurred in the absence of the failure prediction. The system 300 (as well as systems 100 and 200) may provide more detailed and comprehensive failure predictions for additional components of a system in real-time as opposed to existing limited computer-based systems (for instance, a vehicle "check-engine soon" system, oil pressure system, software-based monitoring systems, and/or the like). For example, the system 300 may be able to predict and alert a vehicle operator of a brake failure, a cooling system failure, a transmission failure, a steering failure, and/or the like. The operator may take responsive action, such as changing the operation of the vehicle, stopping use of the vehicle prior to an actual, real-world failure, and/or the like. Existing computer-based systems, including computer-based, software-based, and/or on-board systems, are only able to provide information about systems that have already failed (for instance, a failed oxygen sensor leading to a "check-engine soon" light an elevated temperature due to a cooling system failure being communicated via a vehicle monitoring application or mobile "app"). However, existing computer-based, software-based, and/or on-board systems are not able to provide a prediction of a future component failure, particularly with the speed, accuracy, efficiency, and comprehensive data analysis provided via the LLM agents trained and configured according to various embodiments. The system 300 (and systems 100 and 200) may provide predictions of future component failures so that an operator may take preventive action to eliminate further damage, increased maintenance costs, and/or the like.

In various embodiments, the simulation monitoring LLM agent 370*e* can predict a component failure based on the real-time simulations and the stored off-line simulation and prediction data. The real-time scenarios created by the LLM actor agents 370*a*-370*d* are different from the off-line test scenarios. For example, if the road is wet and/or curved, the LLM actor agents 370*a*-370*d* create a real-time scenario for the transmission being at a high gear in order to determine if any component 112 would fail. Further, the simulation monitoring LLM agent 370*e* can identify test simulations similar to the real-time scenario and associated failure predictions, and based on the identification of similar test simulations and resultant failure predictions, the simulation monitoring LLM agent 370*e* can predict a component failure, determine the reasons for such failure, and provide immediate solutions for such failure with minimal real-time simulation executed.

In various embodiments, the simulation monitoring LLM agent 370*e* may be trained to predict a component failure with an understanding of the most important and valuable scenarios, the reasons for the failure, and the solution to the failure. Further, the simulation monitoring LLM agent 370*e* may be trained on the off-line test simulations for a period of time or a threshold number of simulations, and simulation results, which have generated sufficient data to learn relationships between numerous (for example, and without limitation, millions of) parameters and causes of component failures, which can be changed to prevent the predicted failures.

Accordingly, the simulation monitoring LLM agent 370*e* may be trained to understand the simulation parameters for a possible component failure and to relate the understanding to the use cases, simulation objectives, and resolutions for the possible component failures. For example and without limitation, when a real-time simulation is running for transmission failure, this simulation monitoring LLM agent 370*e* may continuously monitor numerous (for example, and without limitation, hundreds of thousands or even millions of) parameters in real-time and can determine if the simulation objective has been achieved or there needs to be parameter or scenario changes and execute further iteration of simulations based on the changed parameters or scenarios. This process may save time and resources that would otherwise be expended on manual scenario development, expert analysis, and redesigning simulation experiments to confirm a hypothesis associated with the failure prediction.

In various embodiments, since the simulation monitoring LLM agent 370*e* is trained on the continuously monitored data, the simulation data including scenario goals from the secondary LLM actor agents 370*a*-370*d* and test prediction data including the simulation results, predicted failures and solutions to the failures, the simulation monitoring LLM agent 370*e* can provide a most likely scenario and faster inference. Therefore, the simulation monitoring LLM agent 370*e* can determine the most valuable and/or most likely scenarios based on live data streaming from the vehicle sensors 114, utilizing the scarce resource more efficiently and faster than the conventional digital twin or other computer-based simulation technologies.

In addition, the continuous monitoring of the digital twin simulations ensures that the real-time simulation results may have a desired confidence level and thus provides an accurate understanding of the reasons of failures and effective solutions to such failures or other issues. This data alone can be further utilized to train and fine-tune an even more refined and faster version of the simulation monitoring LLM agent 370*e* and/or the LLM actor agents 370*a*-370*d.*

Upon predicting a component failure and providing a solution to the predicted failure, the simulation monitoring LLM agent 370*e* continuously monitors real-time vehicle data, environmental data, and/or simulation data based on a specialized understanding and learning of real-time scenario parameters, real-time and test simulation data and dynamic interactions of the vehicle components 112.

In some embodiments, the simulation monitoring LLM agent 370*e* may transmit the simulation data and prediction data to an operator or other user. For example, via a client application, mobile application (or "app"), on-board vehicle display, and/or the like.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by computer executable instructions stored on a non-transitory computer readable medium or machine readable medium. The embodiments are not limited in this context.

Figure 4:
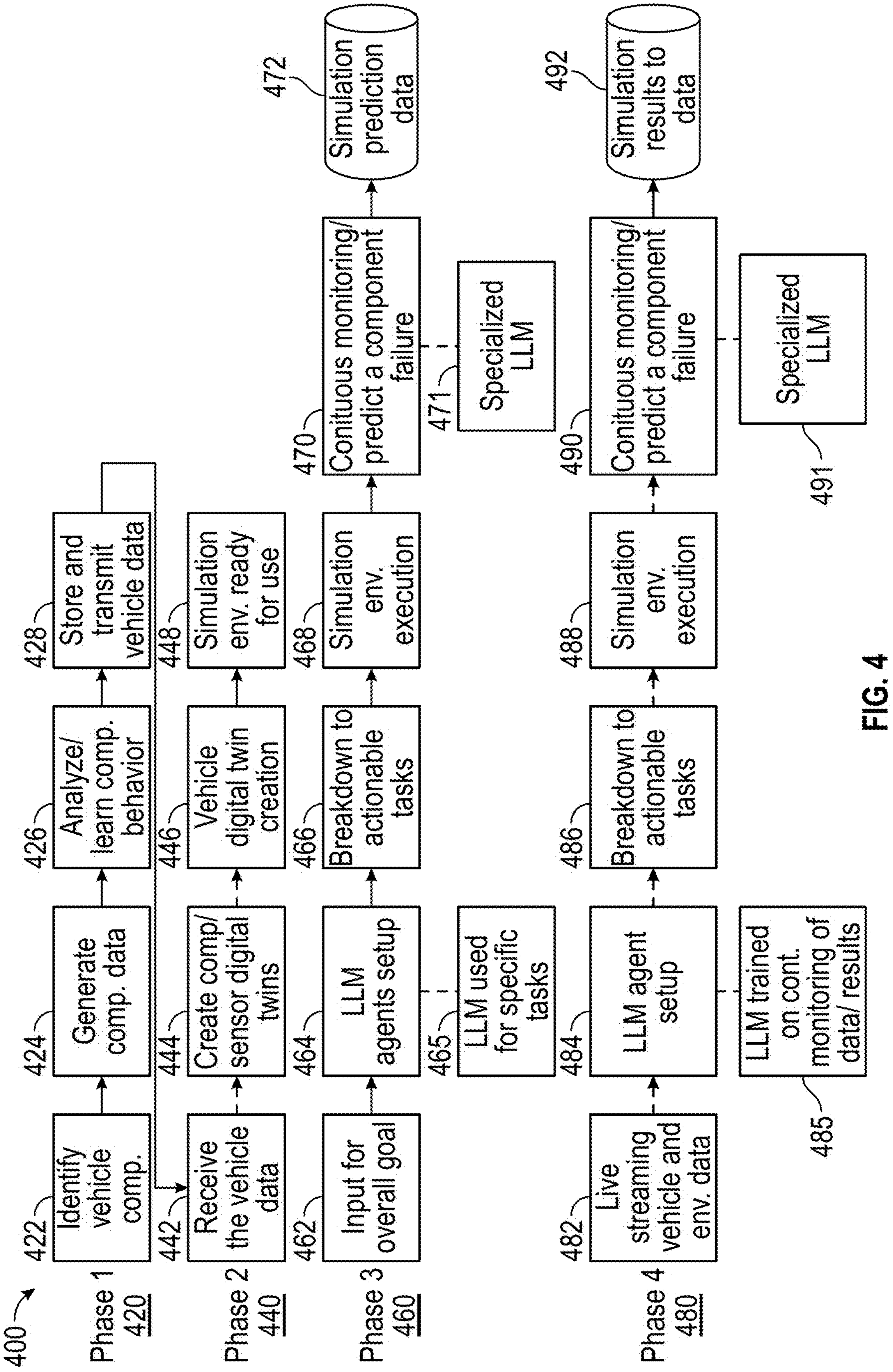
FIG. 4 illustrates a first logic flow in accordance with the present disclosure.

FIG. 4 illustrates an embodiment of a logic flow 400. The logic flow 400 may be representative of some or all of the operations executed by one or more embodiments described herein, such as the system 100, the system 200, the system 300, the control unit 120, and/or the computing device 150. In some embodiments, the logic flow 400 may be representative of some or all of the operations of predicting a component failure using an LLM in combination with a digital twin according to the present disclosure.

In some embodiments, the logic flow (or process) 400 may include multiple phases. In various embodiments, the process 400 may include a vehicle data generation phase 420, a vehicle digital twin creation phase 440, an off-line test scenario simulation and component failure prediction phase 460, and an online real-time simulation and component failure prediction phase 480.

At phase 420, vehicle data of a vehicle are generated and transmitted to a digital twin system. The vehicle data generation phase includes logic flow blocks or steps 422-428. At step 422, the vehicle components of the vehicle are identified. The vehicle components include data generating components and components based on the behaviors of which the data are generated. At step 424, component data are generated by on-board sensors or electrical components based on the behaviors of hardware components (for example, and without limitation, a transmission, motor, battery, etc.). The component data are then processed. The data may be processed, for instance, filtered, cleaned, transformed, normalized, aggregated, and/or the like. For example, component data having different periodic intervals may be transformed to include the same or similar periodic granularity.

At step 426, a behavior profile of each component may be analyzed and learned from the processed component data. For instance, an operational threshold and state of each component (for example, and without limitation, $1^{st}$, $2^{nd}$, $3^{rd}$, $4^{th}$, $5^{th}$ gear or neutral state of the transmission) can be identified based on an analysis (for example, and without limitation, multivariate change event analysis and/or anomaly detection) of the processed data, and ML models (e.g., LLM models or agents) can be used to classify and interpret different components and their states as classes and determine the thresholds and states. At step 428, vehicle data including the component data, analysis results, and learned component behavior profile (for example, and without limitation, thresholds and states of each component) are stored in a data storage for further investigation and analysis and transmitted for digital twin creation, for instance, via digital twin creation software, vehicle diagnosis application 166, and/or the like.

At phase 440, a digital twin of the vehicle is created based on the vehicle data. The digital twin creation phase includes steps 442-448. At step 442, the vehicle data is received by a digital twin system, particularly a digital twin, for instance, digital twin creation software, vehicle diagnosis application 166, and/or the like. At step 444, component and sensor digital twins are created. At step 446, the component and sensor digital twins are combined to create a vehicle digital twin of the vehicle, incorporating all interactions, arrangements and relationships among the components of the vehicle. In some embodiments, the vehicle digital twin is a digital representation of an actual physical vehicle and reproduces overall condition of the vehicle and the components as indicated by on-board sensors and/or other components operative to detect, capture, measure, and/or the like component information. In various embodiments, the vehicle digital twin may represent current vehicle operation and how the vehicle may behave in the future based on the vehicle's current state. At step 448, the vehicle digital twin and associated simulation environment is ready for use.

At phase 460, simulations of off-line test scenarios using the vehicle digital twin and continuous monitoring of the simulations are performed. The off-line test simulations and continuous simulation monitoring phase includes steps 462-472. At step 462, a user inputs and/or an LLM agent generates an overall goal of a simulation. At step 464, LLM agents 465 including a primary LLM actor agent, a plurality of LLM actor agents, and a simulation monitoring LLM agent are set up and configured to perform specific tasks associated with the off-line test simulations and continuous monitoring of the simulations. For example, the LLM agents may analyze data, train, establish parameters and test scenarios based on a user defined simulation objective, and perform test simulations. At step 466, the primary or secondary LLM actor agent breaks down a high-level test scenario into numerous relevant actionable test scenarios. At step 468, off-line test simulations based on the actionable test scenarios are executed. At step 470, the specialized simulation monitoring LLM agent 471 performs continuous monitoring of the off-line test simulations including component failure predictions, identification of the reasons and recommendation of the solutions for the predicted failures. At step 472, the test simulation data and test prediction data including simulation results, prediction analysis, failure predictions, and reasons and solutions for the failures are stored in a data storage.

At phase 480, real-time simulations and continuous monitoring of the real-time simulations are performed. The real-time simulations and continuous simulation monitoring phase includes steps 482-492. At 482, vehicle data of an actual vehicle and environmental data in which the actual vehicle operates are streamed live (in real-time) between the actual vehicle and the vehicle digital twin (or the computing device or system implementing the digital twin). At step 484, the LLM agents 485 including a primary LLM actor agent, secondary LLM actor agents, and a simulation monitoring LLM agent are set up and configured to perform specific tasks associated with the online real-time simulations and continuous monitoring of the real-time simulations. The LLM agents 485 are the same as the LLM agents 465, but the LLM agents 485 are trained and configured for the real-time simulations and continuous monitoring of the real-time simulations. The LLM agent 485 are trained in real-time on continuously monitored and streamed data, which include the real-time simulation data and the prediction data based on the real-time simulations and/or the stored off-line simulation and prediction data. At step 486, the primary and/or secondary LLM actor agent may break down a high-level scenario into numerous actionable scenarios. At step 488, the real-time simulations are executed. At step 490, the specialized simulation monitoring LLM agent 491 performs continuous monitoring of the online real-time simulations including component failure predictions, identification of the reasons, and recommendation of solutions for the predicted failures. At step 492, the real-time simulation data and prediction data including simulation results, prediction analysis, failure predictions, and the reasons and solutions for the failures are stored in a data storage.

Figure 5:
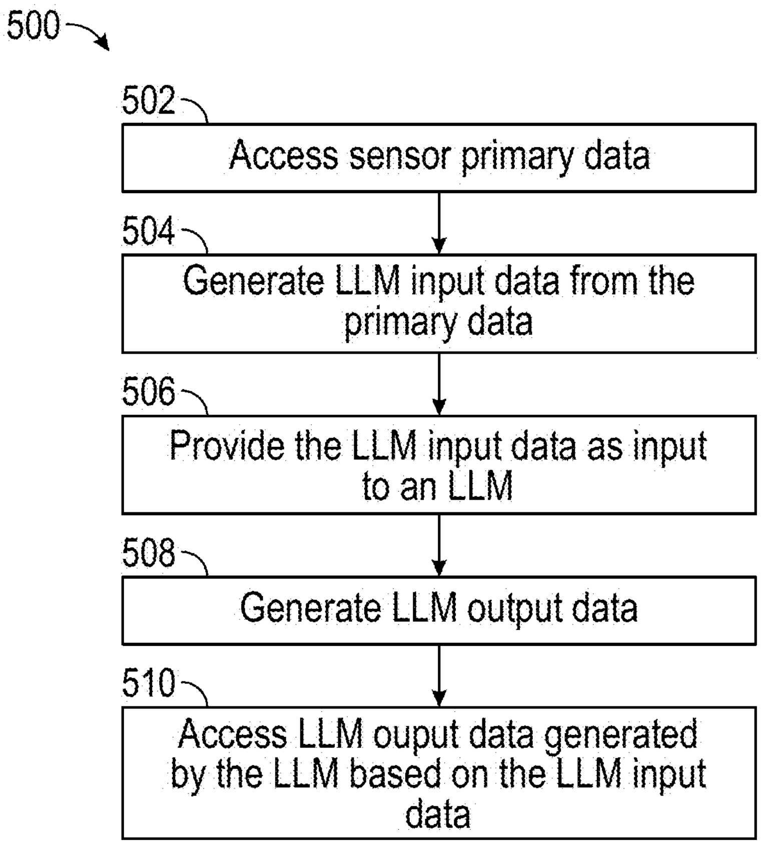
FIG. 5 illustrates a second logic flow in accordance with the present disclosure.

FIG. 5 illustrates an embodiment of a logic flow 500. The logic flow 500 may be representative of some or all of the operations executed by one or more embodiments described herein, such as system 100, system 200, system 300, and/or computing device 150. In some embodiments, the logic flow 500 may be representative of some or all of the operations of processing sensor data via an LLM according to some embodiments.

In some embodiments, the logic flow (or process) 500 may include accessing sensor data at step 502. For example, the diagnostic application 160 may receive sensor data from a sensor 114*a-n* of a vehicle 110 and/or from the sensor data 160 stored on the computing device 150.

At step 504, the logic flow 500 may include generating LLM input data from the primary data 504. For example, the diagnostic application 160, alone or through an LLM application, may transform the sensor data into natural language input, tokens, symbols, characters, values, and/or the like that may be used as language (or text-based) input to an LLM 170*a-n*. In some embodiments, primary (or "raw") sensor data may be tokenized and provided to an LLM 170*a-n*. In one example, the primary sensor data may include analog data. In another example, for a temperature or pressure sensor, the primary sensor data may include one or more analog voltage readings. In further non-limiting examples, the primary sensor data may include GPS coordinates, rotational speed (revolutions-per-minute) data, linear speed data (miles per hour), torque data, light intensity, acoustic information, and/or the like.

At step 506, the logic flow 500 may include providing the LLM input data as input to an LLM. For example, the diagnostic application 160, alone or through an LLM application, may provide a tokenized stream of primary analog data to an LLM 170*a-n*.

The logic flow 500 may generate LLM output data at block 508. For example, an LLM 170*a-n* may be trained to receive LLM input data formed of tokenized (or language-based) input generated from non-language data (e.g., analog data, sensor measurements, numerical values, voltage information, current information, coordinates, speed information, and/or the like) and to generate a text-based output. In some embodiments, the text-based output may be a simulation result, data aggregation result, data classification result, a component failure prediction, and/or the like. For example, an LLM 170-*an* may be trained to make a prediction that the next word or phrase is "failure imminent" responsive to token input of the value X (analog voltage value at time A) followed by the value Y (analog voltage value at time B).

At block 510, the LLM output data generated by the LLM based on the LLM input data may be accessed. For example, the diagnostic application may access the language output of an LLM 170*a-n* indicating a simulation result or a failure prediction for a component. The diagnostic application 166 may process the LLM output accordingly, for instance, updating a display, transmitting a warning, or modifying the operation of a physical entity and/or a component thereof.

Figure 6:
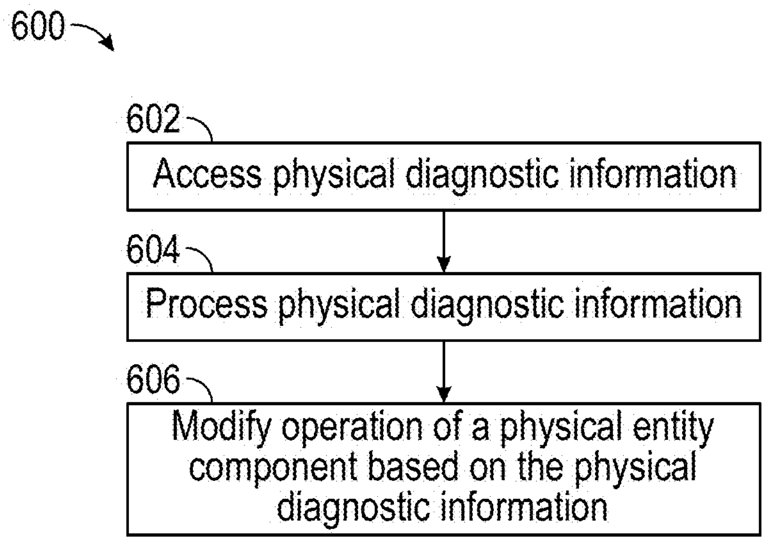
FIG. 6 illustrates a third logic flow in accordance with the present disclosure.

FIG. 6 illustrates an embodiment of a logic flow 600. The logic flow 600 may be representative of some or all of the operations executed by one or more embodiments described herein, such as the system 100, the system 200, the system 300, the control unit 120, and/or the computing device 150. In some embodiments, the logic flow 600 may be representative of some or all of the operations of modifying the operation of a physical entity component based on physical diagnostic system analysis.

In some embodiments, the logic flow (or process) 600 may include accessing physical diagnostic information at block 602. For example, the diagnostic application 602 may receive output from an LLM 170*a-n* responsive to the LLM 170*a-n* processing input data, for instance, from a sensor 114 of a physical entity 110. For example, the sensor 114 may be for a temperature of a pump motor. The physical diagnostic information may indicate an operating status of a component (e.g., the pump), a failure prediction, a reason for the failure, and/or the like.

At block 604, the physical diagnostic information may be processed. For example, the physical diagnostic information may predict a failure of the pump motor based on input data of the temperature of the pump and the rotational speed of the pump. The diagnostic application 166 may process the physical diagnostic information, alone or in combination with sensor information associated with the digital twin 162 according to various embodiments described in the present disclosure.

The logic flow 600 may modify the operation of the physical entity component based on the physical diagnostic information. For example, based on the failure prediction, the diagnostic application 160 may operate (or provide a communication to the physical entity to cause) to shut down the pump to prevent the failure and/or further damage. For example, the control unit 120 or the computing device 150 may receive a communication of a pump failure and, in response, may generate a signal transmitted to the pump to change the operation of the pump (e.g., turning the pump off, changing the pump speed, and/or the like). In another example, the operation may be modified, for instance, the speed of the pump may be lowered or allowed to operate below a threshold speed in order to prevent the predicted failure.

The digital twin technology requires a significant amount of specialized expertise and compute resources, and faces limitations due to its requirement of manual implementation of the specialized expertise, computational demands associated with live simulations and inferencing constraints. The exemplary embodiments resolve these problems by providing a novel system and method of predicting a component failure by LLM agents, which replace specialized experts required for digital twin simulations and failure predictions, and overcome computational resources and inferencing constraints due to latency during real-time simulations. By replacing the specialized experts and overcoming the compute resource and inferencing constraints, the LLM agents can automatically develop simulation scenarios and perform scalable and faster simulations and component failure predictions as compared to the conventional digital twin simulations can. In addition, a specialized simulation monitoring LLM agent continuously monitors the simulations, for example, and without limitation, executed on third-party software, for early termination based on predefined conditions, and changing simulation parameters and/or scenarios. Such continuous monitoring allows the simulation monitoring LLM agent to accurately predict component failures, promptly identify reasons for the failures, and immediately provide solutions to the failure. In addition, since the simulation monitoring LLM agent understands a significant number (for example, and without limitation, millions) of test simulation parameters and relationships in a variety of component specific use cases, the simulation monitoring LLM agent can create hypotheses (for example, and without limitation, a hypothetical failure of a vehicle component) based on the test simulation results, confirm the hypotheses based on the test simulation results, and provide a resolution of the predicted failure as part of the continuous monitoring. Defining the thresholds for parameters of the vehicle component and identifying other components that may have caused the failure enables the simulation monitoring LLM agent to accurately predict a component failure and avoid the actual failure of the vehicle component. The continuous monitoring by the LLM agent prevents unnecessary simulations, thereby saving resources. All of the data associated with the off-line or real-time continuous monitoring is stored in remote or local storage servers.

Additionally, online real-time scenario creation by specialized LLM actor agents using real-time data transferred from each vehicle component is novel and provides a technological advantageous solution in that the specialized LLM actor agents utilize historical data and off-line test simulation data along with live data to build scenarios for live simulations. As such, the specialized LLMs are trained on the historical data and the off-line test simulation data including simulation results computed by other specialized LLM agents and may create the most important and/or likely scenarios with a desired confidence level, and thus effectively monitor real-time simulation executions and results.

While specific embodiments of the invention have been described in detail, it may be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A computer-implemented method, comprising, via processing circuitry of at least one computing device:

generating a digital twin of a physical entity, the digital twin virtually representing the physical entity and a plurality of components of the physical entity;

accessing sensor data of a plurality of sensors configured to measure information of the plurality of components to reproduce operating conditions of the physical entity via the digital twin;

executing a plurality of large language model (LLM) agents trained to predict a component failure of one of the plurality of components of the physical entity virtually represented by the digital twin based, at least in part, on the sensor data, the plurality of LLM agents operative to predict the component failure using simulation scenarios based on a simulation objective and to execute simulations for the simulation scenarios using the digital twin.

2. The computer-implemented method of claim 1, wherein the physical entity is a vehicle.

3. The computer-implemented method of claim 2, wherein the one or more sensors comprise at least one temperature sensor, at least one pressure sensor, at least one rotational speed sensor, or at least one linear speed sensor.

4. The computer-implemented method of claim 2, wherein the one or more components comprise at least one of a transmission component, a braking system component, a steering component, or an exhaust system component.

5. The computer-implemented method of claim 1, wherein the plurality of LLM agents are trained to create off-line test simulation scenarios based on the simulation objective, execute off-line test simulations based on the off-line test simulation scenarios, and continuously monitor the off-line test simulations.

6. The computer-implemented method of claim 5, wherein continuously monitoring the off-line test simulation comprises predicting a component failure based on the simulation results and identifying a reason for the component failure.

7. The computer-implemented method of claim 6, wherein continuously monitoring the off-line test simulation comprises providing a solution for the predicted component failure, the solution comprising stopping or modifying the operation of at least one of the plurality of components associated with the component failure.

8. The computer-implemented method of claim 1, further comprising:

creating, via at least one of the plurality of LLM agents, online real-time simulation scenarios based on the simulation objective, AND executing the online real-time test simulations based on the online real-time simulation scenarios and sensor data being streamed from the plurality of sensors to the digital twin in real-time.

9. The computer-implemented method of claim 5, further comprising:

continuously monitoring the real-time simulation using the digital twin to predict a component failure based on the real-time simulation results and stored off-line test simulations and component failure prediction data;

identifying a reason for the predicted component failure; and providing a solution for the predicted component failure.

10. The computer-implemented method of claim 1, wherein at least one of the plurality of LLM agents is trained to receive tokenized non-text data from at least one of the plurality of sensors and to generate text-based output.

11. The computer-implemented method of claim 10, wherein the text based output comprises a failure prediction of a component associated with the at least one of the plurality of sensors.

12. An apparatus, comprising:

at least one processing circuitry; and a memory coupled to the at least one processing circuitry, the memory comprising instructions that, when executed by the at least one processing circuitry, cause the at least one processing circuitry to:

train at least one large language model (LLM) to predict a component failure of a physical entity based on a digital twin of the physical entity, the digital twin virtually representing the physical entity and a plurality of components of the physical entity, and simulation scenarios based on a simulation objective and execution of the simulations for the simulation scenarios, wherein the simulation scenarios comprise off-line test simulation scenarios and online real-time simulation scenarios.

13. The apparatus of claim 12, wherein the physical entity comprises a vehicle and the one or more components comprise at least one of a transmission component, a braking system component, a steering component, or an exhaust system component.

14. The apparatus of claim 12, further comprising training the at least one LLM agent to provide a solution for the predicted component failure, the solution comprising stopping or modifying the operation of at least one of the plurality of components associated with the component failure.

15. The apparatus of claim 12, wherein:

the at least one LLM agent comprises a primary LLM agent and a plurality of secondary LLM agents, the primary LLM agent is communicatively coupled to the digital twin and at least one external data source, each of the plurality of secondary LLM agents are communicatively coupled to the primary LLM agent and are trained for a specific domain.

16. The apparatus of claim 15, wherein a first of the plurality of secondary LLM agents is configured to create test scenarios based on a defined simulation objective, a second of the plurality of secondary LLM agents is configured to establish initial simulation parameters, and a third of the plurality of secondary LLM agents is configured to determine dynamic conditions among components.

17. A vehicle, comprising:

a plurality of components;

a plurality of sensors configured to measure information of the plurality of components; and an on-board computer system comprising a memory coupled to a processing circuitry, the memory comprising instructions that, when executed by the processing circuitry, cause the at least one processing circuitry to:

access a digital twin of the vehicle, the digital twin virtually representing the vehicle and the plurality of components of the vehicle, the one or more components comprising at least one of a transmission component, a braking system component, a steering component, or an exhaust system component, access sensor data of the plurality of sensors to reproduce operating conditions of the vehicle via the digital twin, and execute a plurality of large language model (LLM) agents trained to predict a component failure of one of the components of the physical entity virtually represented by the digital twin, wherein:

at least a first one of the plurality of LLM agents is trained to predict a failure of a specific component of the plurality of components, and at least a second one of the plurality of LLM agents is trained to receive tokenized non-text data from at least one of the plurality of sensors and to generate text-based output.

18. The vehicle of claim 17, wherein the one or more sensors comprise at least one temperature sensor, at least one pressure sensor, at least one rotational speed sensor, or at least one linear speed sensor.

19. The vehicle of claim 17, wherein the plurality of LLM agents are trained to predict the component failure based on executing off-line simulation scenarios and online real-time simulation scenarios based on the digital twin and the sensor data.

20. The vehicle of claim 17, the instructions, when executed by the processing circuitry, cause the at least one processing circuitry to, modify an operation of at least one of the plurality of components responsive to receiving a failure predication associated with the at least one of the plurality of components.

* * * * *